(12) United States Patent
Cave et al.

(10) Patent No.: US 8,015,172 B1
(45) Date of Patent: Sep. 6, 2011

(54) METHOD OF CONDUCTING SEARCHES ON THE INTERNET TO OBTAIN SELECTED INFORMATION ON LOCAL ENTITIES AND PROVIDE FOR SEARCHING THE DATA IN A WAY THAT LISTS LOCAL BUSINESSES AT THE TOP OF THE RESULTS

(75) Inventors: Mark D Cave, Studio City, CA (US); David Mercer, Spring Valley, CA (US)

(73) Assignee: eBridge, Inc., Encino, CA (US)

( * ) Notice: Subject to any disclaimer, the term of this patent is extended or adjusted under 35 U.S.C. 154(b) by 278 days.

(21) Appl. No.: 12/459,517

(22) Filed: Jul. 3, 2009

(51) Int. Cl.
*G06F 17/30* (2006.01)

(52) U.S. Cl. .......................... 707/706; 707/723

(58) Field of Classification Search .................. 707/706, 707/723
See application file for complete search history.

(56) References Cited

U.S. PATENT DOCUMENTS

| | | | |
|---|---|---|---|
| 6,240,425 B1 | 5/2001 | Naughton | |
| 6,650,998 B1 | 11/2003 | Rutledge | |
| 6,782,383 B2 * | 8/2004 | Subramaniam et al. | 707/706 |
| 6,865,568 B2 * | 3/2005 | Chau | 707/706 |
| 6,980,982 B1 | 12/2005 | Geddes, Jr. | |
| 7,103,589 B1 * | 9/2006 | Kepler et al. | 707/706 |
| 7,133,867 B2 * | 11/2006 | Irle et al. | 707/706 |
| 7,188,100 B2 * | 3/2007 | De Bellis et al. | 707/706 |
| 7,231,383 B2 * | 6/2007 | Andreev et al. | 707/696 |
| 7,231,405 B2 | 6/2007 | Xia | |
| 7,254,576 B1 * | 8/2007 | Hamilton | 707/706 |
| 7,257,570 B2 * | 8/2007 | Riise et al. | 707/706 |
| 7,308,440 B2 * | 12/2007 | Rajarajan et al. | 715/762 |
| 7,349,901 B2 * | 3/2008 | Ramarathnam et al. | 707/706 |
| 7,363,308 B2 * | 4/2008 | Dillon et al. | 707/706 |
| 7,457,628 B2 | 11/2008 | Blumberg et al. | |
| 2005/0160014 A1 | 7/2005 | Moss | |
| 2007/0150369 A1 | 6/2007 | Zivin | |
| 2008/0086460 A1 | 4/2008 | Stewart | |
| 2009/0106225 A1 | 4/2009 | Smith et al. | |
| 2009/0106681 A1 | 4/2009 | Gupta et al. | |

* cited by examiner

*Primary Examiner* — Don Wong
*Assistant Examiner* — Kim Nguyen
(74) *Attorney, Agent, or Firm* — Thomas I. Rozsa

(57) ABSTRACT

The invention utilizes local search engines to view a display of local business listings in order of relevance to the user. Relevance to the user depends on a variety of factors whose importance varies by user and business—these factors include distance from user-defined starting location, business size, whether or not the business is local, content provided with listing, and relevance based on user-defined search terms. The system collects and parses business information from Web pages and other sources, stores the information in a format that facilitates searches, provides a simple way for users to initiate searches, analyzes all the factors mentioned above each time a search is performed, retrieves listings in order of factor importance, and displays results to the user in order and formatted to make further inspection and use of the results easy for the user.

2 Claims, 18 Drawing Sheets

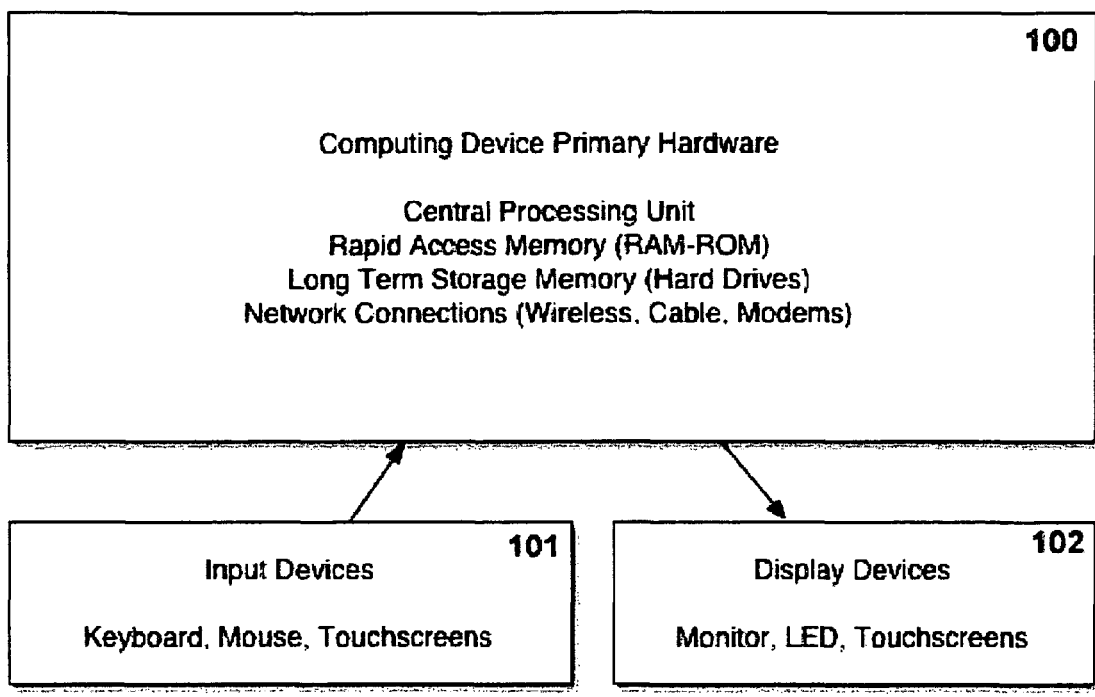

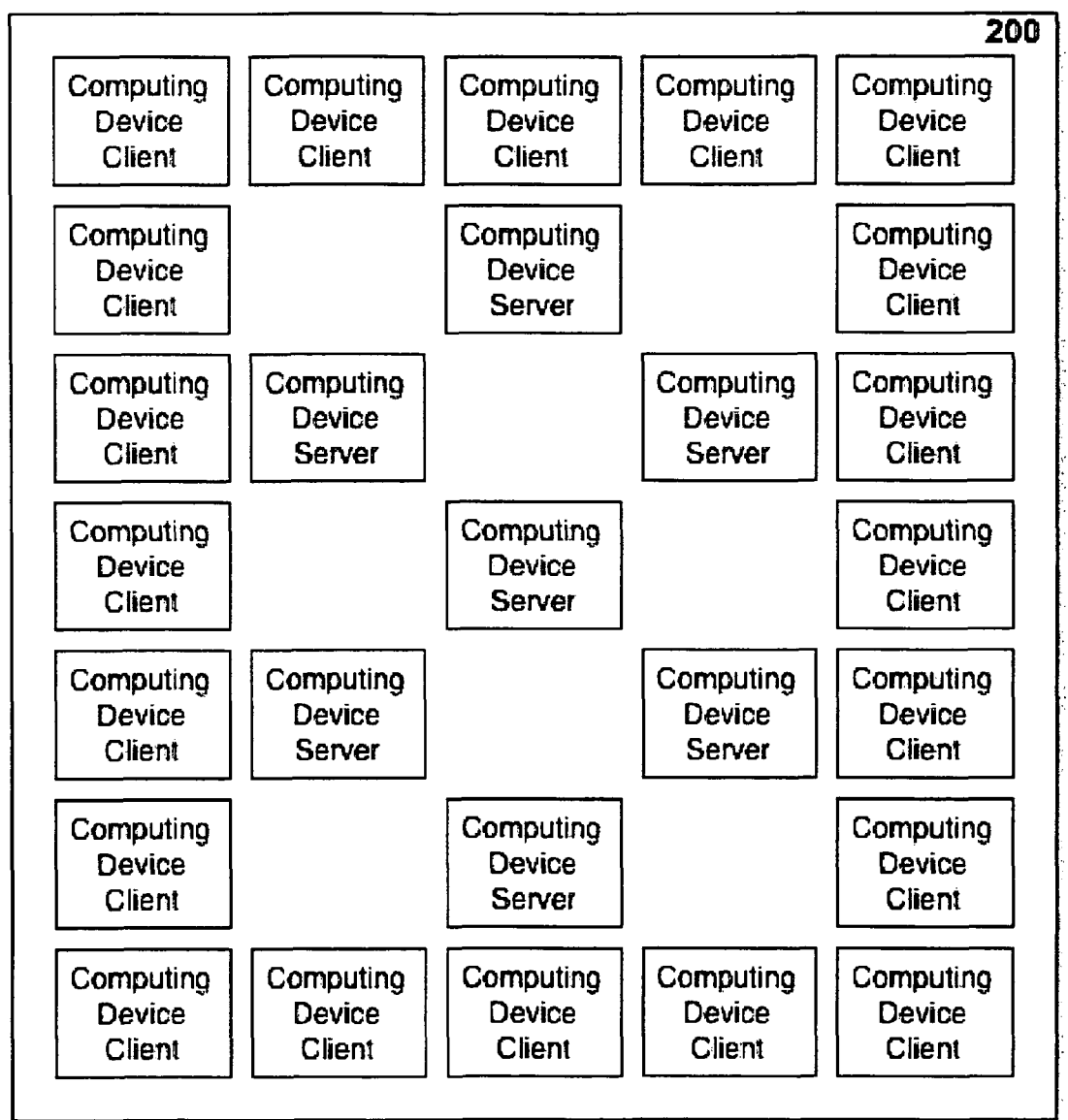

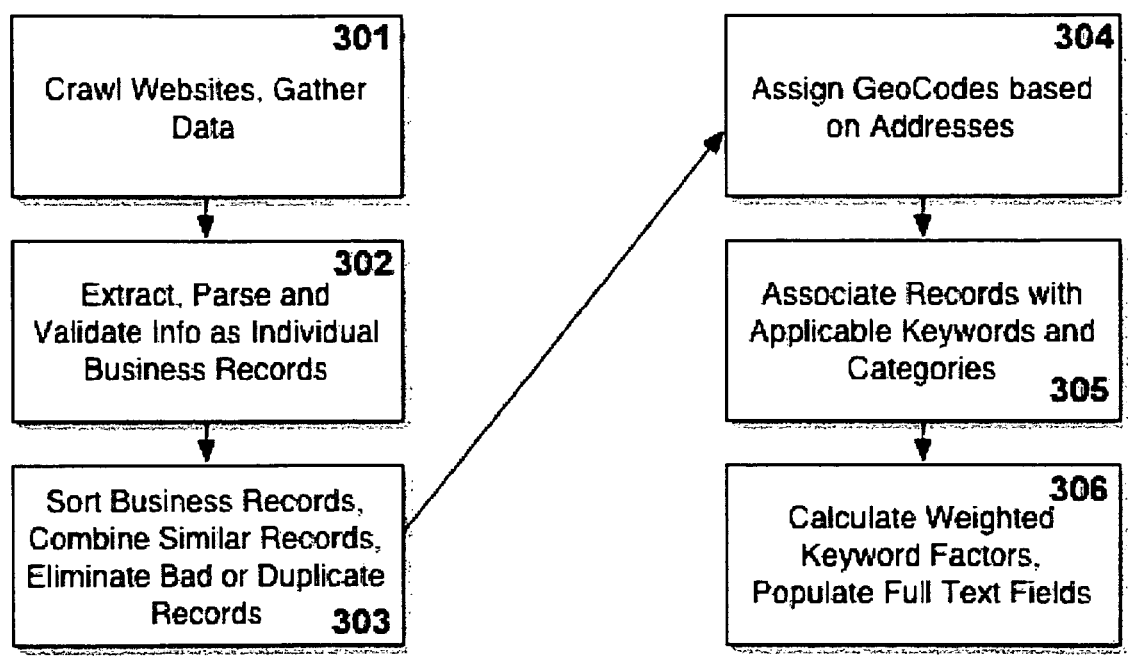

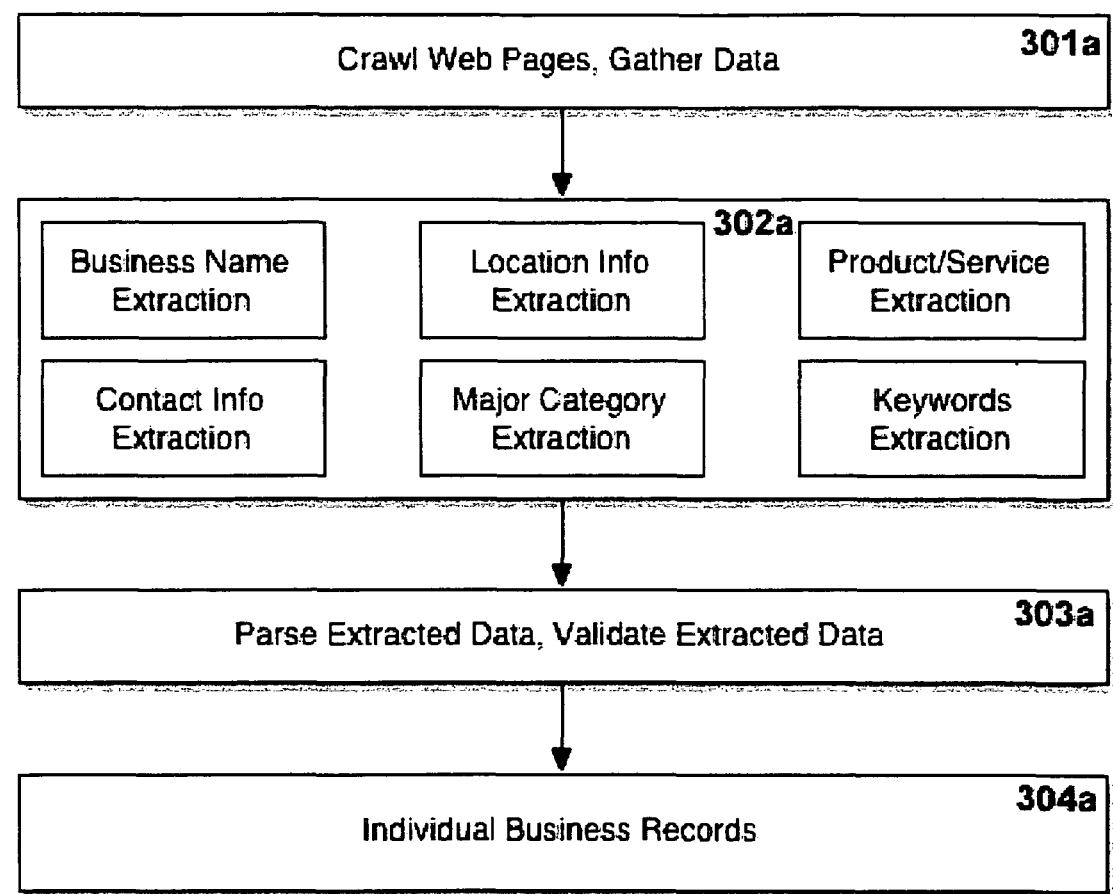

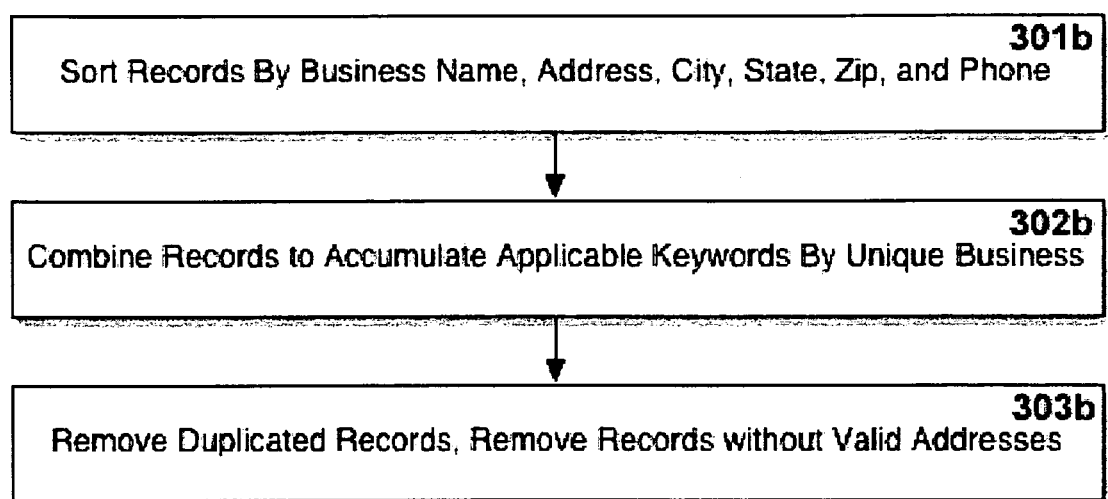

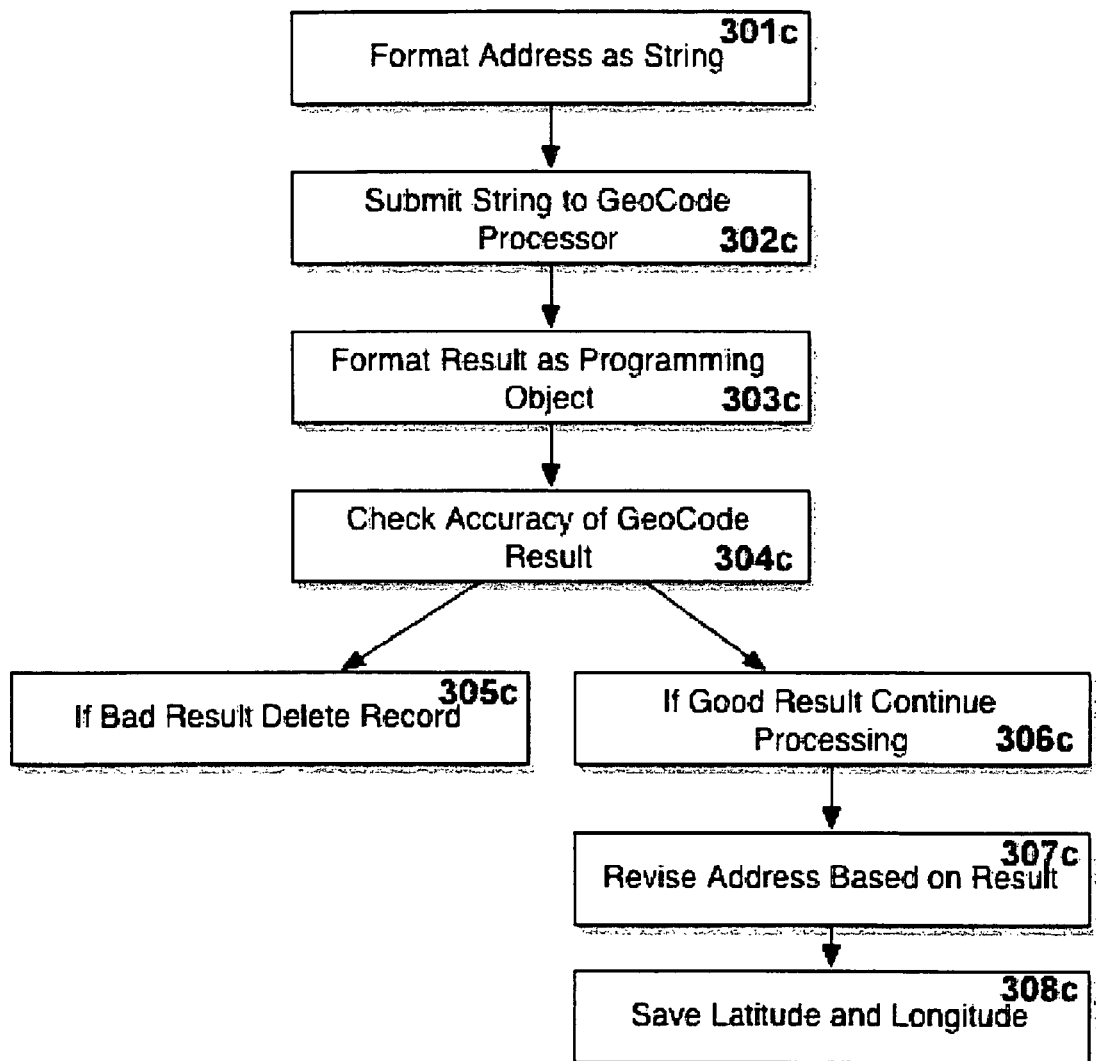

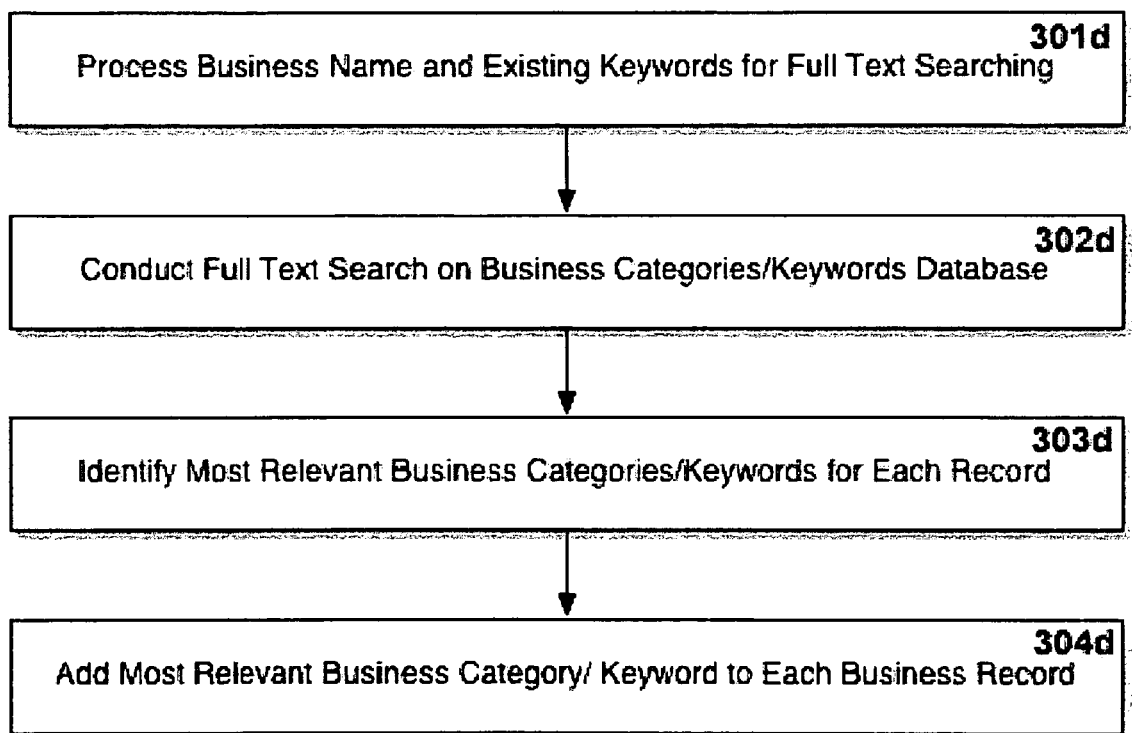

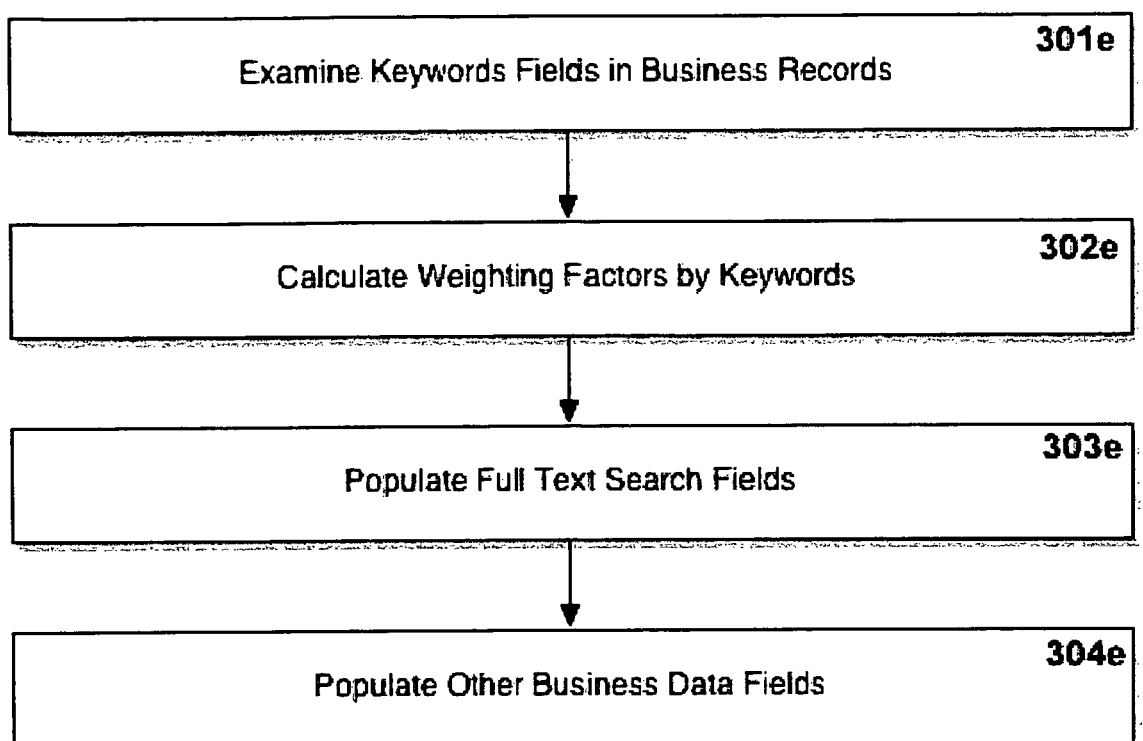

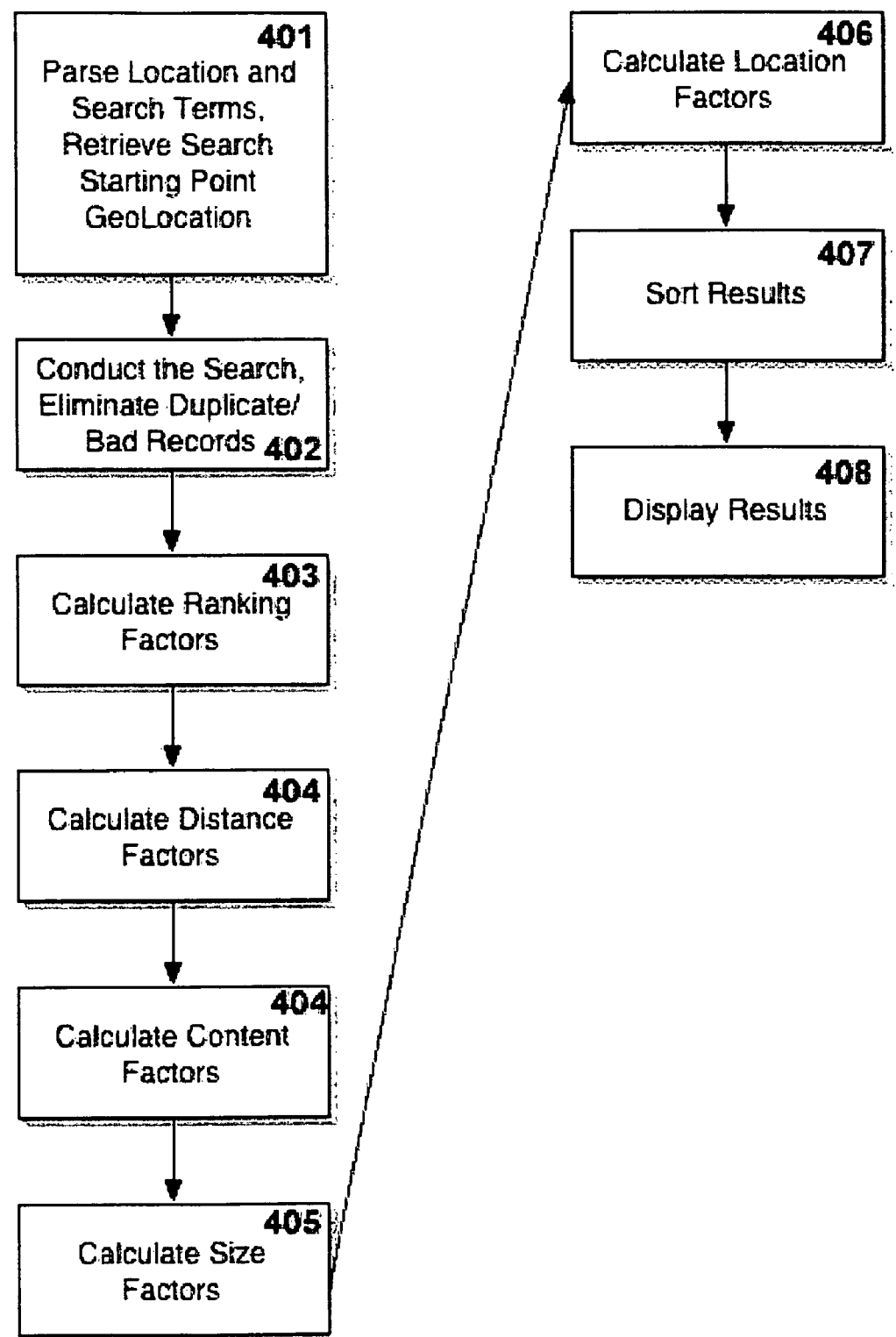

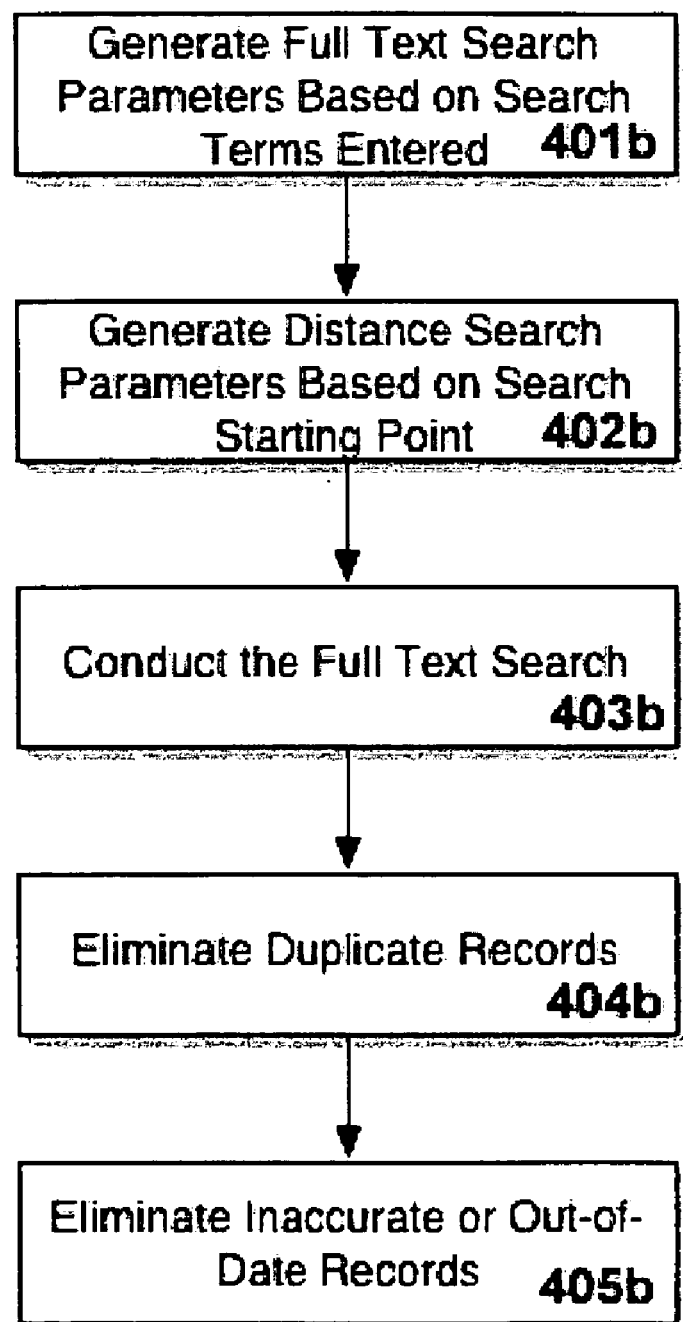

Fig. 4c

Examine Each Keyword in the Record's Full Text Search Fields 401c

↓

Examine Each Search Term Enterd by the User 402c

↓

Generate a Score Based on Comparison of Keywords Entered to Keywords Found 403c

↓

Populate a Generated Field in the results with the Ranking Factor 404c

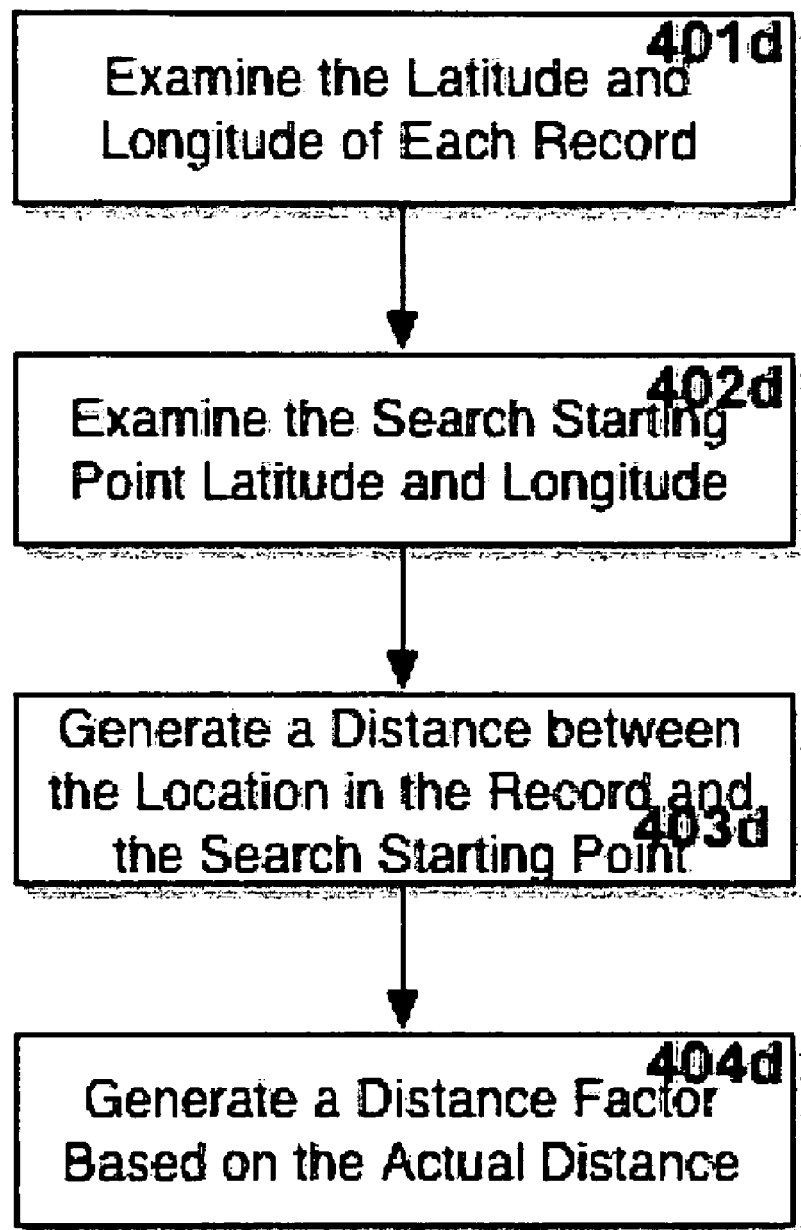

Fig. 4e

Examine the Content in Various Fields in Each Record 401e

Assign Content Factors Based on Content Found and Content Type 402e

Generate a Single Content Factor Based on all Content Factors in the Record 403e

Fig. 4f

Examine the Name of the Business in Each Record 401f

↓

Use the Business Name to Match Names in Another Database. 402f

↓

Retrieve the Size Factor, or Set the Size Factor to the Default 403f

Fig. 4g

Examine the Name of the Business in Each Record 401g

Use the Business Name to Match Names in Another Database. 402g

Retrieve the Local Factor, or Set the Local Factor to the Default 403g

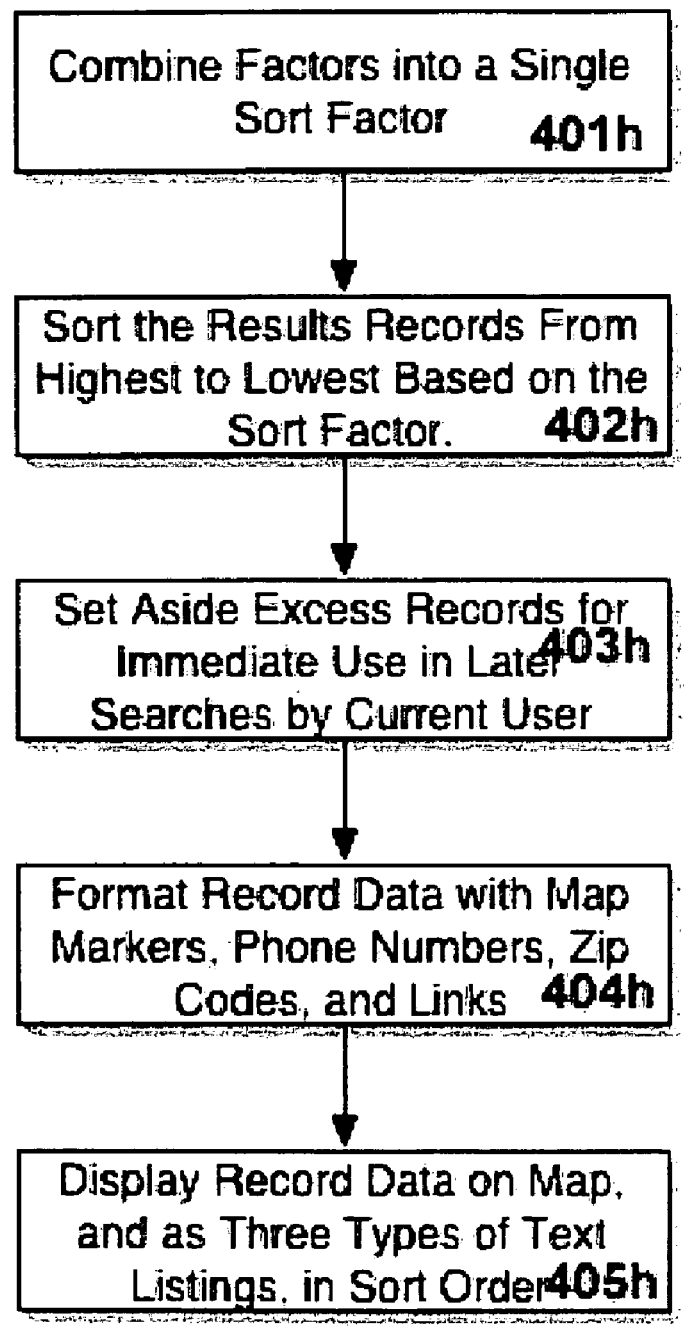

Fig. 5     500

Web Page Header - Logo - Login - Location - Top Menu Displayed

Search Box
Find What - Restaurants
Find Where- Encino, CA
Search Parameters
Entered Here

Highlighted Business Listing

Map Displayed Here Includes:
Search Results Listings Markers
Map Zoom Controls
Map Type Controls

Featured Business Listings

---
Up to 9 Displayed

"Organic" Results Listings
Text Format with Links
Includes:
Company Name
Phone Number
Address
Website Link ---
Up to 9 listings displayed

METHOD OF CONDUCTING SEARCHES ON THE INTERNET TO OBTAIN SELECTED INFORMATION ON LOCAL ENTITIES AND PROVIDE FOR SEARCHING THE DATA IN A WAY THAT LISTS LOCAL BUSINESSES AT THE TOP OF THE RESULTS

BACKGROUND OF THE INVENTION

1. Field of the Invention

The field of the invention relates to a method of conducting searches on the internet. Specifically, computers connected to each other using common communications protocols form computer networks, the most common and ubiquitous one being the Internet. Software on connected computers can often both transmit and receive data—software that "serves" data to many other computers is often called "server" software, and computers fulfilling this role are often called servers—software that primarily receives data from servers is often called "client" software, thus forming a "client-server" relationship on a computer network. One of the most common types of "client-server" relationship is between computers used for browsing the World Wide Web and computers "serving" Web pages to such "client" computers.

Within the realm of browsing for Web pages, a common task is utilizing a search engine Website to retrieve lists of links (and associated snippets of Web page content from the Web page the links were gathered from) to other Websites that the user expects will be relevant to them based on the search terms they used to conduct the search.

Search Engine Websites employ a variety of techniques to gather and "index" (enter into their internal databases) these lists of links and attach weighted values to words found within the Website associated with the indexed link. Users then conduct searches at the Search Engine Website, and the Search Engine Website attempts to sort the results displayed to the search engine user according to a ranking factor that measures the degree to which the search terms entered by the user match the overall weighted values associated with the links listed within the search engine database. Users judge for themselves whether or not the results displayed by a search engine Website are in fact relevant for their own purposes.

Search Engine Websites therefore utilize a variety of algorithms to generate the final ranking factor for each indexed link, in the hope that their algorithms will generate ranking factors that cause the displayed records (sorted according to the ranking factor) to be judged by their users as more relevant than results displayed by other search engine Websites given the same starting search terms. One of the most popular Search Engines in use today is Google (www.google.com).

2. Detailed Description of the Prior Art

The following ten patents and published applications are relevant to the present invention.

1. U.S. Pat. No. 6,240,425 issued to John Naughton on May 29, 2001 for "Geographic Search Engine Having Independent Selections Of Direction And Distance From Relocatable Hub" (hereafter the "Naughton Patent");
2. U.S. Pat. No. 6,650,998 issued to Charles Wayne Rutledge et al. on Nov. 18, 2003 for "Information Search System For Enabling A User OF A User Terminal To Search A Data Source" (hereafter the "Rutledge Patent");
3. United States Published Patent Application No. 2005/0160014 to Andy Moss et al. on Jun. 21, 2005 for "Techniques For Identifying And Comparing Local Retail Prices" (hereafter the "Moss Published Patent Application");
4. U.S. Pat. No. 6,980,982 issued to William T. Geddes, Jr. et al. on Dec. 27, 2005 for "Search System And Method Involving User And Provider Associated Beneficiary Groups" (hereafter the "Geddes Patent");
5. U.S. Pat. No. 7,231,405 issued to Xiongwu Xia and assigned to Doug Norman, Interchange Corp. on Jun. 12, 2007 for "Method And Apparatus of Indexing Web Pages Of A Web Site For Geographic Searchine Based On User Location" (hereafter the "Xia Patent");
6. United States Published Patent Application No. 2007/0150369 to Michael A. Zlvin on Jun. 28, 2007 for "Method And System For Determining The Optimal Travel Route By Which Customers Can Purchase Local Goods At the Lowest Total Cost" (hereafter the "Zlvin Published Patent Application");
7. United States Published Patent Application No. 2008/0086460 to Kelsey Byron Stewart on Apr. 10, 2008 for "Local Search Directory Techniques" (hereafter the "Stewart Published Patent Application");
8. U.S. Pat. No. 7,457,628 issued to Brad W. Blumberg et al. and assigned to Smarter Agent, LLC on Nov. 25, 2008 for "System And Method For Providing Information Based On Geographic Position" (hereafter the "Blumberg Patent");
9. United States Published Patent Application No. 2009/0106681 to Abhinav Gupta et al. on Apr. 23, 2009 for "Method And Apparatus For Geographic Specific Search Results Including A Map-Based Display" (hereafter the "Gupta Published Patent Application");
10. United States Published Patent Application No. 2009/0106225 to Wade S. Smith et al. on Apr. 23, 2009 for "Identification Of Medical Practitioners Who Emphasize Specific Medical Conditions Or Medical Procedures In Their Practice" (hereafter the "Smith Published Patent Application").

The Naughton Patent employs the general concept of having a search engine which provides specific information based upon a geographic location of the item being searched relative to the location of where the person is performing the search or relative to a specific desired location. However, the focus of this patent deals with locating real estate within a certain geographical area and then providing the information to the user about the specific real estate in a pre-selected zone that the user is interested in locating for the purposes of sales or rental.

The Rutledge Patent discloses a system and method are disclosed for searching a data source suing text string searches in which queries and information records are qualified by temporal and/or geographical references. In an exemplary embodiment, temporal and geographical references associated with a query are the date/time the query was last submitted by a user and the user's geographical area of interest (defined by ranges of latitude and longitude coordinates), respectively. The temporal and geographical references associated with an information record are the date/time the record was last modified and the "origin" of the record, respectively. A comparison between the temporal and geographic references associated with a query and those associated with the information records in the data source permits geographically irrelevant records to be suppressed and allows an individual user to receive only information that has been modified since the user last requested it. Thus, search results are automatically pre-filtered prior to transmission to the user thereby conserving network resources and reducing the amount of context-based filtering required of the user.

The Moss Published Patent Application discloses a computer software algorithm which relates to the aggregation and use of local retail information for the purpose of providing a wide variety of valuable services to consumers and retailers. The invention relates to providing services which help consumers find and compare the best prices of promotions for products at their local retail stores. The search interface is presented by which a consumer can identify a first price for a product offered by a first vendor in a geographic area. The search also aggregates local retail information and the retail information includes geographic location information for corresponding retailers. At least the portion of the retail information is retrieved and stored in a database index by the geographical location where the prices for the same product from other retailers in the area are also listed to enable consumers to determine the best price for the product in the area they are searching.

The Geddes Patent discloses a search system and method provide a user with a fast and efficient way to progressively expand a search for providers of a specified search object, such as a good, service, or information; while maintaining a desired link to a beneficiary group including a particular geographic community, a community of interest, or a user-preferred class of providers. More specifically, the user and/or provider is initially associated with at least one of a plurality of beneficiary groups, such as a local church for example, for searching for a provider associated with a user-specified beneficiary group or groups. Thus, a user may conduct a targeted search for a specified search object from providers associated with a similarly specified beneficiary group. The search or beneficiary group can thereafter be expanded by the user, until the user selects a provider of the user-specified good, service, or information, associated with the user-specified beneficiary group(s).

The Xia Patent discloses a method and apparatus of indexing web pages of a web site for geographical searching based upon user location. The patent discloses a local search engine geographically indexes information for searching by identifying a geocoded web page of a web site and identifying at least one geocodable web page of the web site. The system identifies a geocode contained within content of the geocoded web page of the web site. The system indexes content of the geocoded web page and content of the geocodable web page. The indexing including associating the geocode contained within content of the geocoded web page to the indexed content of the geocoded web page and the geocodable web page to allow geographical searching of the content of the web pages.

The Zivin Published Patent Application discloses a method and system for providing customers with means to determine a) how far the customer should be willing to travel to a vendor to purchase locally sold goods and b) what routes the customer should take to minimize his or her total costs. Customers use an Internet search engine to find products or services that they are interested in purchasing in their local area. The search results provide a list of goods along with their current price and store location. Customers select one or more goods they are interested in purchasing and add these goods to a shopping list. A recommendation is provided based on variables such as the customer's estimated value of time, traffic conditions, gas prices, parking fees, automobile miles per gallon, the difference in prices between stores, or other relevant variables. The recommendation informs that customers as to vendors at which he or she should purchase goods and the order in which the locations should be visited so as to minimize total purchase costs.

The Stewart Published Patent Application discloses various technologies and techniques are disclosed for providing and/or facilitating local searching. Basic information is imported from an external data provider about the businesses that are located in a particular locality. A customization feature allows each business to optionally add additional details to a respective business profile associated with the basic information. A categorized grouping of the businesses is created based at least in part upon the basic information. A web site is provided that allows an end user to access a local search directory containing at least the basic information about the businesses. Businesses are included in the directory without having to register. Search engines can use the categorized business directory to retrieve business information limited to a particular locality. A list of matching information is provided to the search engine for use by the search engine in responding to a user request.

The Blumberg Patent discloses a system and method for providing position information using a three-dimensional based grid is provided. The position information may be relayed to an electronic device by providing location information to a database and receiving location-centric information at the electronic device. The system may include a network for continuously updating the database in real-time.

The Gupta Published Patent Application discloses a method and apparatus for geographic specific search results in response to a search request having an address field includes retrieving map portion having the address thereon. The method and system further includes determining entities in geographic relation to the address and generating an entity listing, where the entity listing includes listing of the various entities. These entities may represent any type of business, club, library, government building/office, or other locations. The method and apparatus further includes determining various descriptive terms that relate to the entities which are in geographic relation to the address. These terms include hyperlinks to corresponding entity listings. The method and apparatus further includes generating a visual display that includes: the map portion with the address displayed thereon; an entity portion that includes the entity listing; and a term portion with a taxonomical display of the plurality of terms.

The Smith Published Patent Application discloses a scheme enables the identification of medical professionals having expertise with a particular medical condition or procedure. Areas of expertise are assigned to both conditions and procedures and medical professionals who treat the condition or perform the procedure. A description for treatment is received and used to identify a specific condition or procedure. Upon identification of the condition or procedure, the areas of expertise assigned to the condition or procedure are retrieved. Medical professionals who also have assigned one or more of the retrieved areas of expertise are then identified.

There is a significant need for an improved search engine which enables local businesses to be listed at the top of the search.

SUMMARY OF THE INVENTION

The primary goal of users utilizing local search engines is to view a display of local business listings in order of relevance to the user. Relevance to the user depends on a variety of factors whose importance varies by user and business—these factors include distance from user-defined starting location, business size, whether or not the business is local, content provided with listing, and relevance based on user-defined search terms. The system collects and parses business information from Web pages and other sources, stores the information in a format that facilitates searches, provides a simple means for users to initiate searches, analyzes all the factors mentioned above each time a search is performed, retrieves listings in order of factor importance, and displays results to the user in order and formatted to make further inspection and use of the results easy for the user. In addition, the system is constructed such that newly defined relevance factors can easily be incorporated into the system in a way that makes the displayed results even more relevant.

Use of conventional Search Engine Websites may return listings that are relevant but not geographically convenient compared to the location of the searcher. Local Search Engines or conventional Search Engines using geographic search capability may return results that are both relevant and geographically convenient.

Embodiments of the invention significantly overcome the limitations of traditional ranking factor algorithms by employing algorithms that not only retrieve business listing records that are relevant based on text content within the records, but also by several additional factors related to the size, geographical location, content media types, number of locations, and relevance to search. Thus, the invention produces results that users find more relevant than by using other search algorithms.

In addition, users prefer to receive results including even businesses that do not have Websites. The invention lists all businesses, whether or not those businesses have a traditional Website. This has the advantage of enabling fast searches with greatly reduced cost for server networks required to deliver results in a reasonable time. This and the unique ranking factors calculated by the invention also have the advantage of pushing small, local business closer to the top of the results—when they would otherwise go unnoticed when searched for on conventional search engines.

The storage and processing of business data rather than only Web pages, and the calculation of not only geographic data but also size, localness, and relevance data, set the invention apart in terms of its ability to produce relevant results for users. For example, in U.S. Pat. No. 7,231,405, geographical location data and a regionally-based incoming link algorithm form a substantial part of the relevance of its results.

The present invention relates to is a reverse of how ordinary informational search engines operate. Traditionally, when a request is made for a search engine, the search engine usually delivers the most linked to or most popular results for the query. This is fine in general but if someone is looking for a specific local enterprise which is close to the individual's home or place of business, this type of search engine will not provide the desired result.

The concept of the present invention search engine is an algorithm which delivers the "least frequently found" result to the top of the rankings which least frequency found results are located within a certain geographic distance of the individual performing the search. This algorithm provides the following primary business benefits:

1. This is an advantage for small businesses struggling to survive against the big box retailers in corporate competition, and 2. Provides a truly local view of the interne for the user where the small main street mom and pop stores are seen first before the large chains are brought up on the search engine.

The key features of the algorithm of the present invention search engine are as follows:

1. Each search location is evaluated and a preselected given geographic distance or other specific measurement from the location where the search is performed is computed which includes the city, the state and a specific predefined geographic distance. In rural areas the difference may be several miles. In a city the distance may be only a fraction of a mile.

2. The search engine determines the zip codes of the various locations within the preselected geographic distance from the search. The search engine has a list of the least frequently found businesses or small mom and pop locations for each zip code in the entire nation. When the search is performed, when the large retailers come up, those are put to the bottom of the list and the small mom and pop locations in that geographic code that satisfy the search requirements are placed to the top of the list.

Therefore, what this search engine does is it basically lists the least frequently found businesses or other sources where the individual is searching which are in the specific geographic range where the search is performed and this is based on zip code and other factors that place this business within the preselected geographic range and the least found businesses are placed at the top of the search list and are displayed so that they are shown at the beginning of the search list and thereafter the more frequently found businesses are placed at the bottom of the search list for the reasons as set forth above.

The specific focus and steps of the invention on the least frequent algorithm are as follows:
set the number of rows to display per page
check to see which page to display
process any incoming what and where values
see if previous search results exist, and use them if so
parse a search location, and get appropriate latitude and longitude, or the city and state
process search keywords into a string appropriate for a full text search
check a default distance to search from a central point represented by the latitude and longitude or city and state and retrieve all zip codes within the default distance—default distances may start at 2 miles in rural areas or even a few blocks for larger cities
perform the first search on an information database, limiting the result set to 900, and generating a relevance factor for each resulting record
perform a second search for paid members in the search region but with records from the additional zip codes table (using the zip codes from the first search), limited to 30, also generating a relevance factor for each resulting record
verify that all resulting records are current and properly paid or unpaid members
generate distance values for each record
remove any duplicate records (by exact match on company name only)
find up to two paid members at random and mark as sponsored listings
sort members by rank from highest to lowest
sort members by distance from center
mark records as chains and sort highest frequency chains lowest
generate content factor and selected factor
sort members by content factor and selected factor
sort lowest rank members to bottom, according to the cut-off rank
set a pages link
remove member records that are already marked as sponsored listings
strip off records assigned to previous pages
get additional data for reach record, process and clean data, get any missing geocodes
deliver results to user The step starting with "mark records as chains" is the one in which the "sort least frequency found businesses to the top" takes place. Before this step can occur, the list is composed of least frequently found businesses (the code that produces this list is rerun periodically, depending on updates to the list of all businesses in the country), and during this step the system matches businesses in the main database to businesses on this list, and if a match is found it marks the record in the search results with the "least frequent" value, and then it sorts the search results in reverse order, so the least frequently found flow to the top of the results.

It is to be understood that both the foregoing general description and the following detailed description are exemplary and explanatory only and are not restrictive of the invention as claimed The accompanying drawings which are incorporated in and constitutes a part of the specification, illustrate one embodiment of the invention and together with the description, serve to explain the principles of the invention.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a generalized illustration of a computing device;

FIG. 2 is a generalized illustration of a computing network;

FIG. 3 is a high-level illustration of data gathering, processing and storage;

FIG. 3a is a detailed illustration of data gathering, processing and storage showing crawl web pages, gather, parse and validate data;

FIG. 3b is a detailed illustration of data gathering, processing and storage illustrating sort records, combine records and remove duplicate records;

FIG. 3c is a detailed illustration of data gathering, processing and storage showing assigned geocodes based on addresses;

FIG. 3d is a detailed illustration of data gathering, processing and storage showing associate records with additional keywords and categories;

FIG. 3e is a detailed illustration of data gathering, processing and storage showing calculate weighted keywords factors, populate full text search fields;

FIG. 4 is a high level illustration of data processing, formatting and delivery;

FIG. 4b is a detailed illustration of search processing, formatting and delivery illustrating conducting the search, eliminating duplicate or bad records;

FIG. 4c is a detailed illustration of search processing, formatting and delivery showing calculating ranking factors;

FIG. 4d is a detailed illustration of search processing, formatting and delivery illustrating calculating distance factors;

FIG. 4e is a detailed illustration of search processing, formatting and delivery showing calculating content factors;

FIG. 4f is a detailed illustration of search processing, formatting and delivery illustrating calculating size factors;

FIG. 4g is a detailed illustration of search processing, formatting and delivery illustrating calculating local factors;

FIG. 4h is a detailed illustration of search processing, formatting and delivery showing sorting and displaying the results; and FIG. 5 is an illustration of an example query and data output in several forms.

DETAILED DESCRIPTION OF THE PREFERRED EMBODIMENTS

Figure 4A:
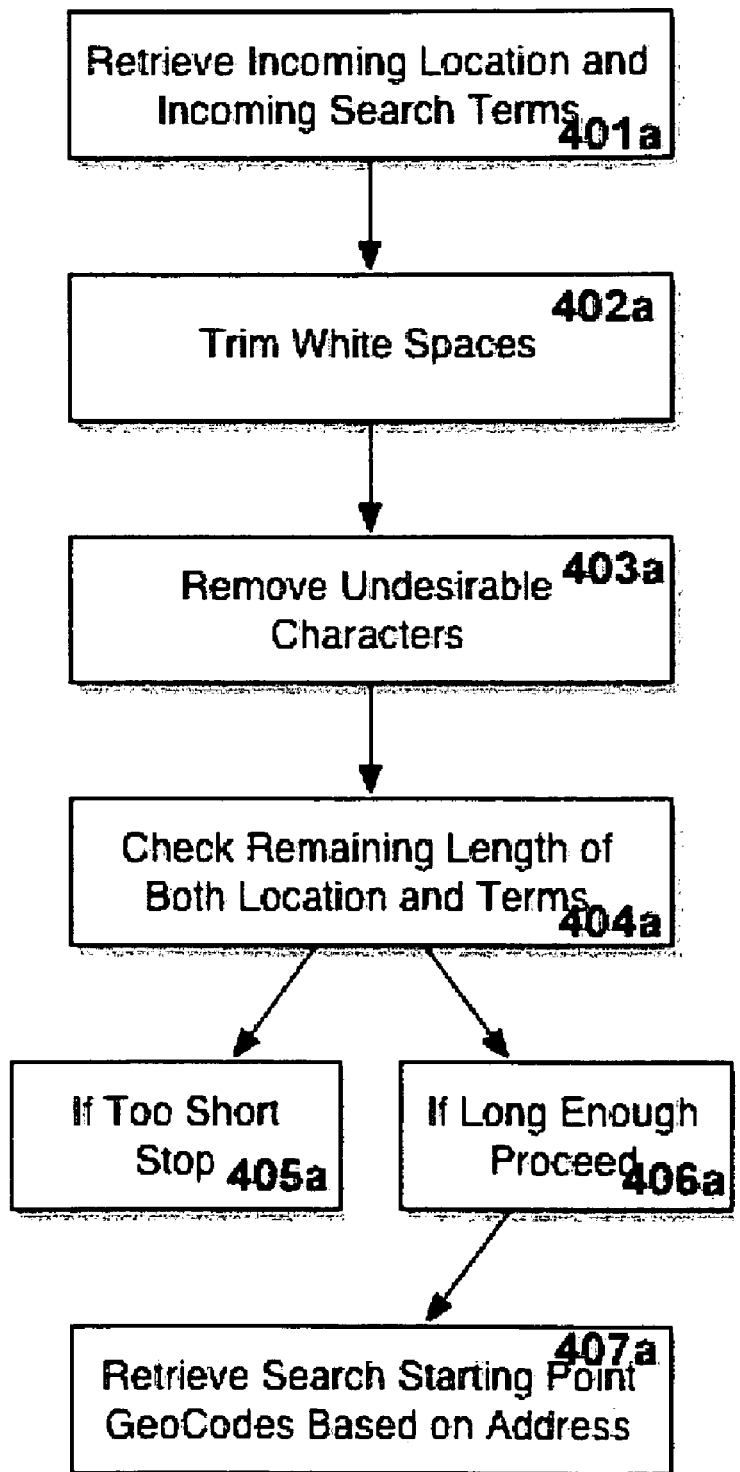
FIG. 4a is a detailed illustration of search processing, formatting and delivery illustrating parsing location and search terms, retrieving search starting point.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The invention comprises two primary methods that together accomplish the functionality of the invention: Data Gathering, Processing, and Storage and Search Processing, Formatting, and Display. Both of these methods are discussed in detail below. The data used in the invention and the computing devices and software/algorithms comprising the invention are distributed in numerous locations on the Internet as well as local, non-Internet computer networks.

Data Gathering, Processing and Storage

In practice, the invention accomplishes its task of delivering highly relevant results to users using a stepwise process. Data gathering is performed by one or more server computers, programmed with some of the invention's software algorithms, that identify and extract data from multiple data sources.

FIG. 1 show a generalized representation of a computing device upon which the software to perform data gathering may be loaded and run. Generally, computing devices contain (100) a central processing unit, short and long term data storage devices, and network connections to connect them with computers on the Internet or local networks. Data input (other than data communicated via the network, is performed via input devices (101) such as keyboard, mouse, and touch-screen, while data output is performed via monitor (102).

FIG. 2 shows a generalized representation of a computer network (arrows removed for clarity (200)). All operations of the invention are supported by public or private computer networks, because the data and software used by the invention is distributed across such networks.

Computers in a network configuration such as the internet may serve both as server computers and as client computers, although in common practice some computers are more often servers than the clients, and as such are configured to provide much more computing a delivery capability, while the majority of computers in such a network are configured to check and receive data from the server computers and only occasionally deliver information to server computers. In the illustration of FIG. 2, all computers are connected to each other via wireless or wired connection, employing IP addresses to uniquely identify them and internet protocols to communicate. Lines and arrow indicating such connections and communications protocols have been left off for clarity.

Computing devices supporting data gathering, processing, storage, searching, and delivery are termed "server" computers—server computers generally having very robust processors and storage devices in order to serve the needs of many simultaneous users, while computing devices used to request search results are termed "client" computers, and may be almost any computing device capable of making an Internet connection, from desktop computers to laptop computers to cell phones. Therefore, no distinction is made between computing devices shown in FIG. 2—all of them contain the general hardware and capabilities for computing devices as shown in FIG. 1.

FIG. 3 shows an overview of the steps employed to gather process and store data in the format required for search and display according to the goal of the invention. (300)

This process begins with crawling authoritative Web pages (301 and 300a) (in the current embodiment Web pages related to businesses found in the United States, but the invention is capable of crawling Web pages related to businesses anywhere in the world) across the Internet and extracting data related to local businesses (the invention is not limited to crawling or parsing Web pages, and can in fact be used to extract data from any text-based document).

Additionally, business data may be gathered and entered into the system manually via direct contact (phone or email contacts) with the business owner, and portions of the system also allow business owners to enter or enhance their business data themselves.

Such information includes specific search terms and keywords associated with the business (302a) (such as major line of business, and products or services for sale), contact information (such as business name, phones numbers, and email addresses) address data associated with the business (such as physical addresses and zip codes), and content information (such as the Website URL of the business, if it exists).

The extracted raw data is further processed (303a) so that zip code, telephone, and email data is properly formatted and a determination is made whether the data is actually valid (in the current embodiment, the system validates US zip codes and phone number, but can use any validation method desired, so that zip codes and phone numbers from other countries can also be processed). The result is a set of individual business records. (304a).

The extracted data at this point consists of records containing extracted data as non-unique rows. Each row may contain data associated with a business that is also represented in other rows. Therefore, an essential next step is the compilation of all pertinent data into single unique records representing a single business per record.

To accomplish this compilation, the records are first sorted by business name and address (301b). Then, the keywords in records having the same name and address are accumulated into a single field which is then attached to a single record for this business name and address. (302b) Duplicate records and records without valid addresses are removed. (303b)

To ensure that accurate geographic location information is obtained, the system first formats address data as a string. (301c) The invention uses specialized algorithms to identify data that appears to be addresses (such as validation routines the check for the format of addresses, and verification routines that check to see if the zip code actually exists). Next, the address string is submitted to a third-party geocoding service (302c) (in the current embodiment, the invention uses the Google geocoding service, but any geocoding service that produces accurate results may be employed). The resulting geocode is formatted as a programming object to facilitate further processing. (303c) The accuracy of the result is checked (304c), and if accurate geocodes (numerical values indicating latitude and longitude) cannot be obtained the record is discarded (305c). If accurate geocodes are obtained (306c) the address information is adjusted as necessary (307c), and the latitude and longitude are attached to the record. (308c)

The company name, keywords, and preliminary categories are processed (removing excess white spaces and other undesirable characters) and formatted to be suitable for Full Text processing (301d). A Full Text search is conducted upon a database of standardized Keywords and Categories. (302d) The most relevant Keywords and Categories from the standardized database are retrieved (303d) and the additional relevant categories and keywords are then added to the record. (304d)

The records are then inserted into the main database used by the invention to fulfill search requests by users. (300e) Each keyword in each business record being inserted into the main database is examined (301e), a weighting factor calculated (302e), the Full Text search field populated (303e), and the remaining fields of the main database then populated (304e). The system is now ready to serve search results.

Search Processing, Formatting and Display

FIG. 4 shows an overview of the process by which search results are obtained in response to a user search request (400).

Search Processing begins with a search query entered by a user. (401 and 400a) The search query consists of two parts: the location to search, and keywords representing the type of business, product, and services the user wishes to find. (401a) Both incoming search terms are trimmed (402a), undesirable characters (characters which should not be included in a normal search, or which could lead to broken search code) are removed (403a), and the length of the search terms is checked. (404a) Terms too short are rejected with an error message to the user (405a). Terms that are long enough allow processing to proceed. (406a).

Under conditions in which the user has not initiated a search, the system will attempt to populate the user's starting point automatically and then conduct a search for any businesses in the user's area, as a courtesy. The initial location data is populated automatically by employing software and third-party data services (in the current embodiment, the invention uses the MaxMind IP Geolocator service, but the invention is not limited to the use of IP address to determine the user's location, and can accept valid location data generated by any method).

During deliberate searches, the user may enter any starting point (such as a full address, zip code, or even identifiable street corners in a city, so long as the length of the string entered is sufficient to warrant further processing. The location portion of the search query is processed (using the Google GeoCode service, but any GeoCode service returning accurate latitude and longitude may be used) to identify the most likely latitude and longitude, and this data is saved for use later. (407a).

The search terms portion is processed to remove undesirable characters and to format the keywords to facilitate full-text searches. (401b).

At this point, factors identifying the radius of the search, as well as the depth of detail to be displayed on the map, are calculated—default values for both these factors are used if none are supplied by the user (the user has the ability to set these values under some circumstances). Depending on the search radius to be used, parameters used to define the search area are calculated and retrieved. (402b).

To facilitate the delivery of search results, the first time a search is performed the results are cached, and subsequent searches use the cached results if applicable. If cached search results are not available, a full search is performed using the processed location data as modified by the search radius parameters and the processed search terms.

The full search is performed (403b) against records processed during Data Gathering, Processing, and Storage, and retrieved records fall within the boundaries defined by the search radius parameters previously calculated. Duplicate business records are identified by name and removed. (404b). The retrieved records are sorted in a manner that allows for the removal of out-of-date or inactive records and then such records are removed. (405b).

The retrieved search results begin as raw business records containing a text-relevance factor indicating how closely the keywords and other words in the record match the search terms entered by the system user (401c, 402c, 403c, and 404c), as well as contact and location data related to the business.

Distance from the center point of the search is calculated and assigned to each record, using algorithms based on the formulas found here: http://en.wikipedia.org/wiki/Great-circle_distance. (401*d*, 402*d*, 403*d*, and 404*d*)

Each record is then examined for specific content types available, for example, the presence of a Website URL. The types and amounts of content present within the listing are used to calculate a content factor. (401*e*, 402*e*, and 403*e*)

Each record is then compared to records in another database indicating the size of the business. The contents of the other database, consisting of factors related to the frequency with which the business is found in the main database, are assembled in an automated fashion, and related to the raw business records by business name. (401*f*, 402*f*, and 403*f*)

Each record is then compared to records in another database indicating the degree of "localness" of the business. The contents of the other database, consisting of factors related to the localness of the business, are assembled both manually and in an automated fashion, and related to the raw business records by business name. (401*g*, 402*g*, and 403*g*)

Each record is then checked against a database indicating the number of times users selected the current record each time the same search was performed previously. Records that have been selected more frequently than others in previous searches are assigned an additional factor that moves them closer to the top of the list, on the presumption that users have found them more relevant. We call this factor user-indicated-relevance.

These comparisons result in the calculation of factors indicating how local and small the business is. The distance, text-relevance, user-indicated-relevance, localness, size, and content factors all are combined into a single sort factor (401*h*), and the records are then sorted according to this factor, with the closest, smallest, most relevant, and most local businesses at the top of the list. (402*h*)

Depending on the record set to be shown (often referred to as "pages", meaning the number of records to be displayed as the list of results for one "page" in the search results display page of the Website), a "page" full of records (defaulting to 9 records) is identified for display and the remaining records are stored in temporary storage associated with the user making the search, so that those records may be retrieved if the user decides to proceed to view the next "page" of records. (403*h*)

The results are then formatted into a listing making it easy for the user to review and select relevant businesses, and matched with markers that appear on the map, so users can easily determine which businesses within walking, biking, or driving distance. (404*h*)

Any results falling within these three relevant distance measures are shown by markers on the map, but businesses listed but outside these three distance measures are also shown on the map, and even if outside the currently displayed map borders they can be displayed by the user via the map controls provided. (405*h*)

The listings are linked to another page in the site that displays additional information, maps, reviews, and other pertinent data.

FIG. 5 shows the finished data as it is displayed in the current embodiment of the invention running at zipweb.com (500).

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method of conducting a search comprising:
   a. set the number of rows to display per page;
   b. check to see which page to display;
   c. process any incoming what and where values;
   d. see if previous search results exits, and use them if so;
   e. parse a search location, and get appropriate latitude and longitude, or the city and state;
   f. process search keywords into a string appropriate for a full text search;
   g. check a default distance to search from a central point represented by the latitude and longitude or city and state and retrieve all zip codes within the default distance;
   h. perform the first search on an information database, limiting the result set to 900, and generating a relevance factor for each resulting record;
   i. perform a second search for paid members in the search region but with records from the additional zip codes table (using the zip codes from the first search), limited to 30, also generating a relevance factor for each resulting record;
   j. verify that all resulting records are current and properly paid or unpaid members;
   k. generate distance values for each record;
   l. remove any duplicate records (by exact match on company name only);
   m. find up to two paid members at random and mark as sponsored listings;
   n. sort members by rank from highest to lowest;
   o. sort members by distance from center;
   p. mark records as chains and sort highest frequency chains lowest;
   q. generate content factor and selected factor;
   r. sort members by content factor and selected factor;
   s. sort lowest rank members to bottom, according to the cutoff rank
   t. set a pages link;
   u. remove member records that are already marked as sponsored listings;
   v. strip off records assigned to previous pages;
   w. get additional data for reach record, process and clean data, get any missing geocodes; and
   x. deliver results to user.

2. The method in accordance with claim 1 wherein before the step of sort least frequently found business is performed, the list is composed of the least frequently found businesses and the code that produces this list is rerun periodically, depending on updates to the lists of all business in the area where the search is performed, and during this step the system matches businesses in the main database to business on this list and if a match is found, it marks the record in the search results with the "least frequent" values, and then it sorts the results in reverse order, so the least frequently found float to the top of the results.

* * * * *